US009813401B2

(12) United States Patent
Malatesha et al.

(10) Patent No.: US 9,813,401 B2
(45) Date of Patent: Nov. 7, 2017

(54) ACCESSING NETWORK SERVICES USING A NETWORK ACCESS SERVICE

(71) Applicants: Rathnakara Malatesha, Sunnyvale, CA (US); Lana Wong, Randolph, NJ (US); Hiroshi Kitada, Tuckahoe, NJ (US)

(72) Inventors: Rathnakara Malatesha, Sunnyvale, CA (US); Lana Wong, Randolph, NJ (US); Hiroshi Kitada, Tuckahoe, NJ (US)

(73) Assignee: Ricoh Company, Ltd., Tokyo (JP)

( * ) Notice: Subject to any disclaimer, the term of this patent is extended or adjusted under 35 U.S.C. 154(b) by 129 days.

(21) Appl. No.: 14/886,999

(22) Filed: Oct. 19, 2015

(65) Prior Publication Data

US 2017/0111338 A1   Apr. 20, 2017

(51) Int. Cl.
*H04L 29/06*   (2006.01)
*H04L 29/08*   (2006.01)

(52) U.S. Cl.
CPC .............. *H04L 63/08* (2013.01); *H04L 63/10* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 2004/0093502 A1* | 5/2004 | Shurygailo | H04L 63/104 713/183 |
| 2005/0160264 A1* | 7/2005 | Kuhn | H04L 63/045 713/168 |
| 2014/0223527 A1* | 8/2014 | Bortz | H04L 63/08 726/6 |
| 2015/0206139 A1* | 7/2015 | Lea | G06Q 20/02 705/44 |
| 2016/0077818 A1* | 3/2016 | Nos | G06F 8/60 717/177 |

* cited by examiner

*Primary Examiner* — Brandon Hoffman
(74) *Attorney, Agent, or Firm* — Hickman Palermo; Becker Bingham LLP; Edward A. Becker

(57) ABSTRACT

A network access service operates as an intermediary between client applications and network services. The network access service is configured to perform one or more authentication processes required by the network services on behalf of the client applications. This includes the network access service obtaining and managing access tokens on behalf of the client applications. The network access service reuses access tokens and automatically acquires new access tokens upon expiration. The network access service is also configured to format data from a client application into a format required by a network service and to provide application program interface and language support required by a network service.

20 Claims, 5 Drawing Sheets

ACCESSING NETWORK SERVICES USING A NETWORK ACCESS SERVICE

FIELD OF THE INVENTION

Embodiments relate generally to accessing network services over networks.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Continued development of the Internet has made a wide variety of cloud-based services available to users. One common example are cloud storage services that allow users to store information on network storage devices, i.e., in "cloud storage," accessible via the Internet. Cloud storage allows users to store and retrieve data from any device that has Internet connectivity. This allows users to store their personal data, such as contact information, photos, videos, etc., at a single location that can be accessed by all of their personal computing devices.

Despite their many benefits, there are several issues related to using cloud-based services. One issue is that cloud-based services often use an authentication mechanism to allow third party access without exposing user credentials. For example, OAuth 2.0 is an open authorization standard that provides secure third party delegated access to resources on behalf of a resource owner using access tokens. Such authentication mechanisms, however, may be complex and require numerous interactions to obtain a valid access token, creating a burden on both client devices and cloud services. A greater number of authentication interactions increases the load on cloud services. In addition, access tokens are user/application/device and cloud service specific, requiring that a separate access token be obtained for each user/application/device and cloud service combination. Moreover, access tokens usually have a short lifespan for security purposes and are sometimes not reusable, so the particular authentication mechanism required by the cloud service must be re-performed before a subsequent request from the same user/application/device can be made. This may be required, for example, even if there is a disruption in connectivity that causes a client application to have to re-submit a request to a cloud service. Another drawback is that cloud services often use specific application program interfaces (APIs) and language, such as C++, Python, etc., and require particular data formats, e.g., XML, ReST, SOAP, etc., that add complexity and may not be supported by some third party applications.

SUMMARY

An interactive whiteboard appliance includes one or more processors and one or more memories that store instructions. Processing of the instructions causes a network access service to perform receiving, from a client application executing on a first client device, a first request for the client application to access a network service that requires performance of a particular authentication process for access. In response to the network access service receiving, from the client application executing on the first client device, the first request for the client application executing on the first client device to access the network service, the network access service performs, based upon user credentials for a user of the client application, the particular authentication process on behalf of the client application executing on the first client device to obtain an access token for accessing the network service. The network access service uses the access token to access the network service on behalf of the client application executing on the first client device and then again performs, based upon user credentials for the user of the client application, the particular authentication process on behalf of the client application executing on the first client device to obtain a second access token for accessing the network service. The network access service receives, from the client application executing on a second client device that is different than the first client device, a second request for the client application executing on the second client device to access the network service and uses the second access token to access the network service on behalf of the client application executing on the second client device.

BRIEF DESCRIPTION OF THE DRAWINGS

In the figures of the accompanying drawings like reference numerals refer to similar elements.

DETAILED DESCRIPTION

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.

I. OVERVIEW
 II. SYSTEM ARCHITECTURE
  A. Client Devices
  B. Network Services
  C. Network Access Service
 III. ACCESSING NETWORK SERVICES
  A. Connection Management
  B. Logical Groups
 IV. IMPLEMENTATION MECHANISMS I. Overview A network access service operates as an intermediary between client applications and network services. The network access service is configured to perform one or more authentication processes required by the network services on behalf of the client applications. This includes the network access service obtaining and managing access tokens on behalf of the client applications. The network access service reuses connections and automatically acquires new access tokens upon expiration. The network access service is also configured to format data from a client application into a format required by a network service and to provide application program interface and language support required by a network service. The approach relieves client applications from having to perform authentication processes required by network services and from having to support particular data formats and application program interfaces required by network services. The approach also reduces the number of authentication processes that need to be performed by reusing access tokens.

II. System Architecture

Figure 1:
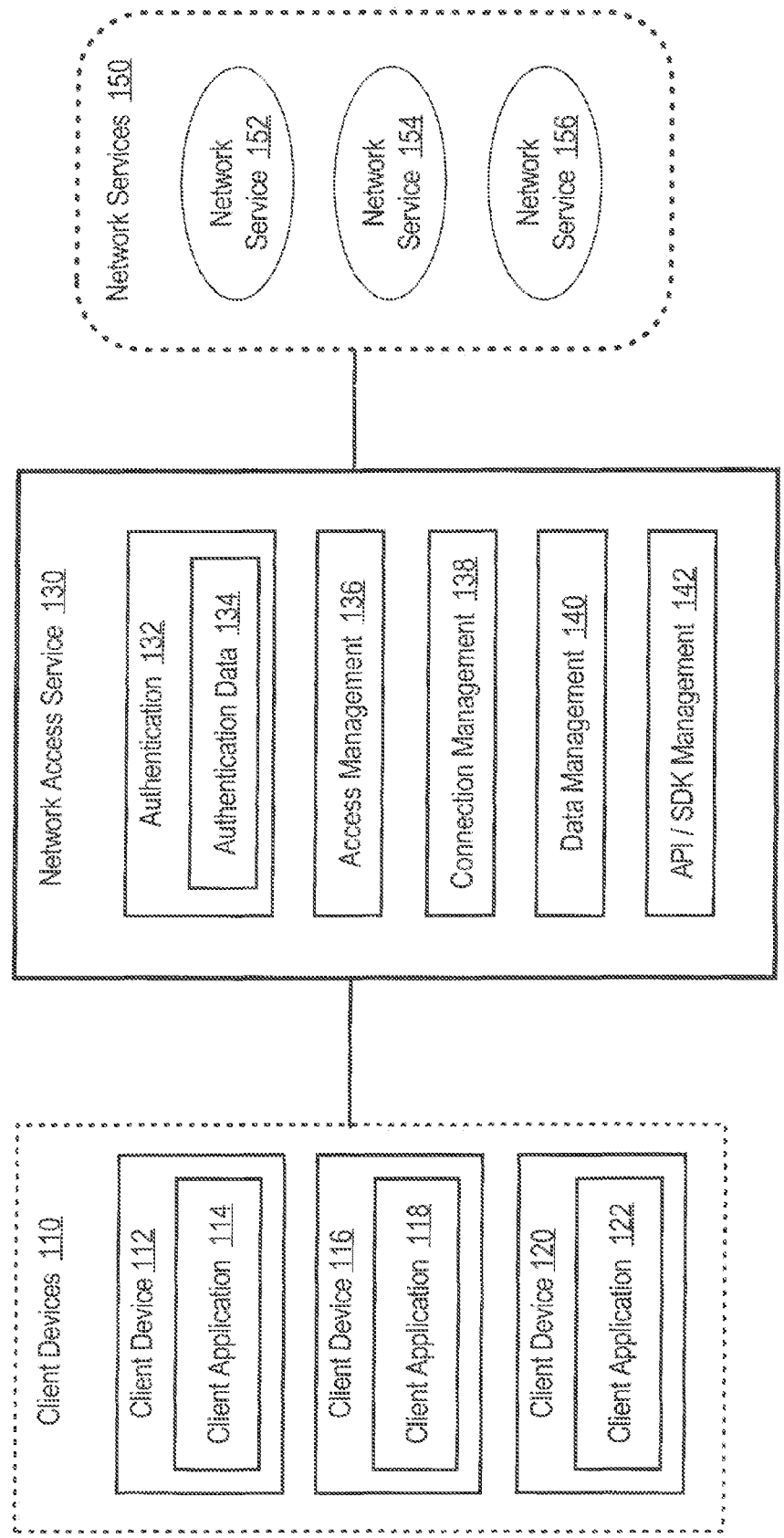
FIG. 1 is a block diagram that depicts an arrangement for accessing network services.

FIG. 1 is a block diagram that depicts an arrangement 100 for accessing network services. Arrangement 100 includes client devices 110, a network access service 130 and network services 150. Client devices 110, network access service 130 and network services 150 may be communicatively couple via one or more networks including, for example one or more wired or wireless networks, such as local area networks (LANs), wide area networks (WANs), the Internet, as well as one or more direct connections. Arrangement 100 is not limited the particular elements depicted in FIG. 1 and may include fewer or additional elements depending upon a particular implementation.

A. Client Devices

Client devices 110 include client device 112, 116, 120, each having a client application 114, 118, 122, respectively, executing thereon. Client devices 112, 116, 120 may be any type of client devices and examples include, without limitation, a workstation, a personal computer, a laptop computer, a tablet computing device, a personal digital assistant, a smart phone, or other telephony devices. Client devices 112, 116, 120 may be implemented by computer hardware, computer software, or any combination of computer hardware and computer software. Client applications 114, 118, 122 may be implemented by any type of application that is configurable to generate requests with respect to network services 150, as described in more detail hereinafter. Client devices 112, 116, 120 are depicted in the figures and described herein in the context of having a single client application 114, 118, 122 for purposes of explanation only, and client devices 112, 116, 122 may have any number of applications and processes executing thereon. Arrangement 100 is depicted in the figures and described herein as having three client devices 112, 116, 120, but embodiments are applicable to any number of client devices.

B. Network Services

Network services 150 include network service 152, 154, 156, which may be any type of network service, including so called "cloud" services. Example implementations of network services 152, 154, 156 include, without limitation, data storage and retrieval services, data sharing services, and data processing services. Network services 152, 154, 156 may be implemented together or separately one or more computing devices. For example, network services 152, 154, 156 may be implemented as separate cloud services and provided by different providers.

C. Network Access Service

Network access service 130 operates as an intermediary between client applications and network services and is configured to perform, on behalf of the client applications 114, 118, 122, one or more authentication processes required by the network services. Network access service 130 is also configured to format data from client applications 114, 118, 122 into formats required by network services 152, 154, 156 and to provide application program interface and language support required by network services 152, 154, 156.

Network access service 130 may be implemented by computer hardware, computer software, or any combination of computer hardware and computer software. For example, network access service 130 may be implemented as a software process executing on one or more processors of a general purpose computer. FIG. 1 depicts example functionality provided by network access service 130 including authentication 132, access management 136, connection management 138, data management 140 and application program interface (API)/software development kit (SDK) management 142.

Authentication 132 includes performing authentication processes required by network services 150 and managing authentication data 134. Authentication data 134 may be stored in any location that is accessible to network access service 130. For example, authentication data 134 may be stored in storage on a computing device that hosts network access service 130. As another example, authentication data 134 may be stored remotely on another device that is accessed by network access service 130 via one or more networks. Authentication 132 may include authenticating users of client applications 114, 118, 122, authenticating client applications 114, 118, 122 and authenticating network access service 130. This may also include acquiring and managing access tokens.

Access management 136 includes processing requests from client applications 114, 118, 122 to access network services 152, 154, 156 and causing execution on network services 152, 154, 156 of a requested function, e.g., store, retrieve, process, etc. Network access service 130 may implement an application program interface (API) used by client applications 114, 118, 122. The API provides an interface used by client applications 114, 118, 122 to request that various functions be executed on network services 152, 154, 156. According to one embodiment, a request includes the following information:

a. Data that identifies the client application/user making the request b. Data that identifies a particular network service to perform a function c. Data that specifies a function to be performed, e.g., store, retrieve, process, etc.

d. Data that identifies a location for content, e.g., directory, etc.

e. Data that specifies access data, such as application access keys, secret access keys, etc.

Connection management 138 includes access token acquisition and management, including determining the validity of access tokens, reusing access tokens for multiple requests and automatically obtaining new access tokens upon expiration.

Data management 140 includes selecting a correct data format required by the target network service and converting data received by a network application into the correct data format. API/SDK management 142 includes providing language and platform support between a requesting client application and a target network service. This ensures compatibility with a large set of client applications that have implemented incompatible and legacy interfaces.

III. Accessing Network Services

Figure 2:
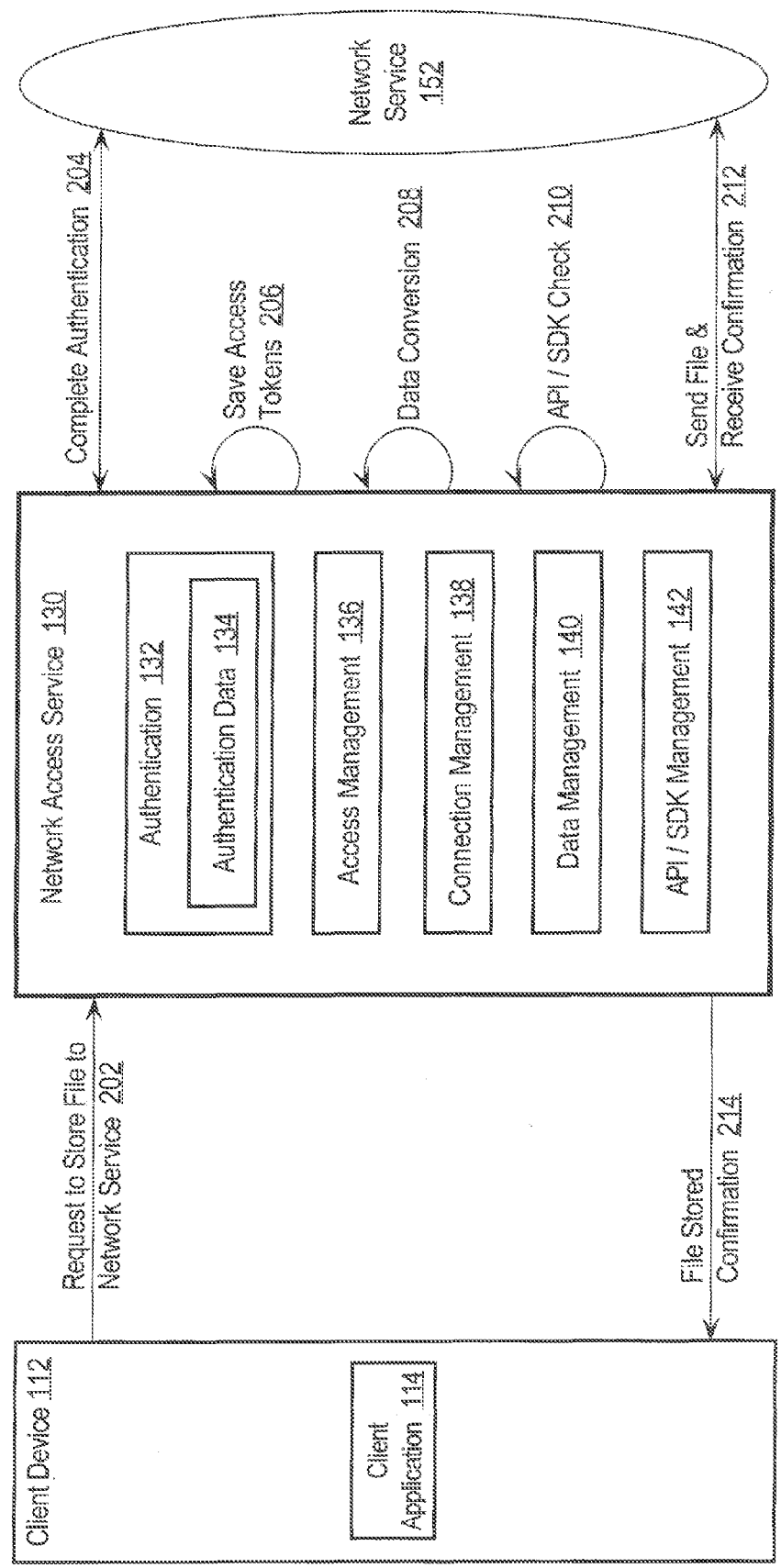
FIG. 2 is a block diagram that depicts an arrangement for accessing network services.

FIG. 2 is a block diagram that depicts an arrangement 200 that is the same as arrangement 100, except for purposes of explanation depicts a single client device 112 accessing a single network service 152. FIG. 2 also depicts example messages exchanged between client application 114, network access service 130 and network service 152. In this example, network service 152 provides data storage and retrieval services and client application 114 requests to store a file on network service 152 using network access service 130.

In step 202, client application 114 generates and transmits, to network access service 130, a request to store a file on network service 152. Client application 114 may generate and transmit the request in response to a user instruction, for example, via a graphical user interface generated by client application 114. The request specifies client application 114, a user of client application 114 (or a logical group as explained in more detail hereinafter), the data that is to be processed, e.g., stored, by network service 152, and network service 152. The request may include the data to be stored on network service 152, or the request may include a reference, such as a link, to the data to be stored on network service 152. The request may also specify access data, such as application access keys, secret access keys, etc., needed by network access service 130 to perform authentication required by network service 152. For example, client application 114 may provide a secret obtained during the registration of client application 114 with network service 152.

Network access service 130 receives the request and in step 204, performs authentication 132 and access management 136 as required by network service 152 on behalf of client application 114 and without any involvement of client application 114. As described in more detail hereinafter, unlike conventional approaches that require regular re-authentication, even for the same user, client application and network service, network access service 130 acts as a proxy for users and client applications and automatically performs authentication and maintains valid access tokens on behalf of client applications.

The particular authentication performed may vary depending upon a particular implementation and embodiments are not limited to any particular type of authentication. Authentication 132 may include several steps. For example, authentication 132 may include an initial handshake mechanism, e.g., in accordance with OAuth 2.0, to register client application 114 with network service 152 to obtain a secret and an identification for client application 114, to authenticate a user of client application 114 with respect to network service 152 to obtain an authorization code, and use of the authorization code for the user and the secret for client application 114 to acquire an access token. In this example, the access token is specific to network service 152, and also both client application 114 and a user of client application 114, since the access token is generated based upon the secret for client application 114 and the authorization code for the user of client application 114. Embodiments are not limited to this example, however, and access tokens do not need to be specific to both client application 114 and the user of client application 114.

Obtaining an authorization code for the user of client application 114 may require user credentials, such as a user identification and password, or an access key and a secret access key. User credentials for the user of client application 114 that may be acquired in different ways. For example, user credentials may be included in the request 202, or acquired from the user of client application 114, e.g., during a user registration process, or by querying the user for their user credentials. This may include, for example, network service 152 generating a graphical user interface that queries the user of client application 114 for the user's credentials. User credentials may also be stored by users or an administrator and stored by network access service 130. Performing the authentication required by network service 152 may include the use of services external to network access service 130 and network service 152.

Figure 3:
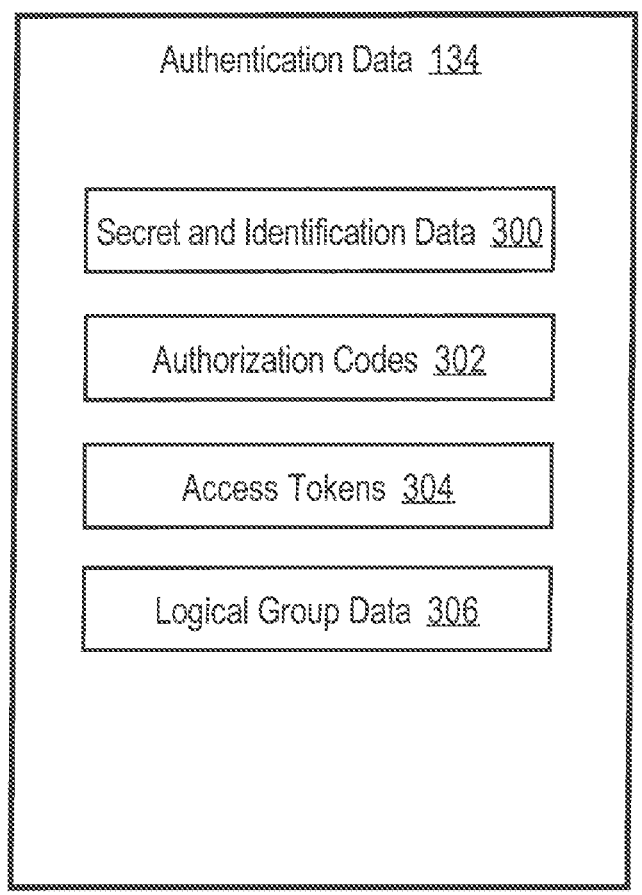
FIG. 3 depicts authentication data that includes a secret and identification data for a client application, authorization codes and access tokens.

In step 206, network access service 130 saves access data related to the authentication process. This may include a wide variety of data, depending upon the particular authentication performed. For example, referring to FIG. 3, network access service 130 may save, in authentication data 134, secret and identification data 300 for client application 114, authorization codes 302, such as the authorization code for the user of client application 114, and access tokens 304, such as the access token acquired for the user of client application 114. According to one embodiment, access tokens 304 are associated with particular users to support re-use of access tokens 304 as described in more detail hereinafter.

In step 208, network access service 130 performs any required data management 140 to convert data into a format supported by network service 152. In step 210, network access service 130 performs an API/SDK management 142 to ensure that the language and commands of the request are supported by network service 152. In step 212, network access service 130 transmits to network service 152 the file and access data required by network service 152, such as an access token, and receives a confirmation indicating whether the storage request was successfully processed. In step 214, network access service 130 generates and transmits to client application 114 a response indicating whether the storage request was successful.

A. Connection Management

According to one embodiment, network access service 130 is configured to provide connection management 138 functionality to allow connections to network services 150 to be maintained. This may include, for example, maintaining connections to allow processing of multiple requests from particular client applications to particular network services. For example, according to one embodiment, when a request is received from a client application, network access service 130 determines whether a valid access token is available to process the request. If so, then the access token is used to process the request with the requested network service. If not, then authentication is performed as previously described herein to obtain a new access token on behalf of the requesting client application, without any involvement by the client application.

According to one embodiment, network access service 130 is configured to automatically maintain current access tokens. This may include, for example, determining whether a particular access token is about to expire and then automatically re-performing authentication to obtain a new access token. This may be performed within a specified time of expiration of an access token, e.g., prior to expiration, or after an access token as already expired.

Figure 4:
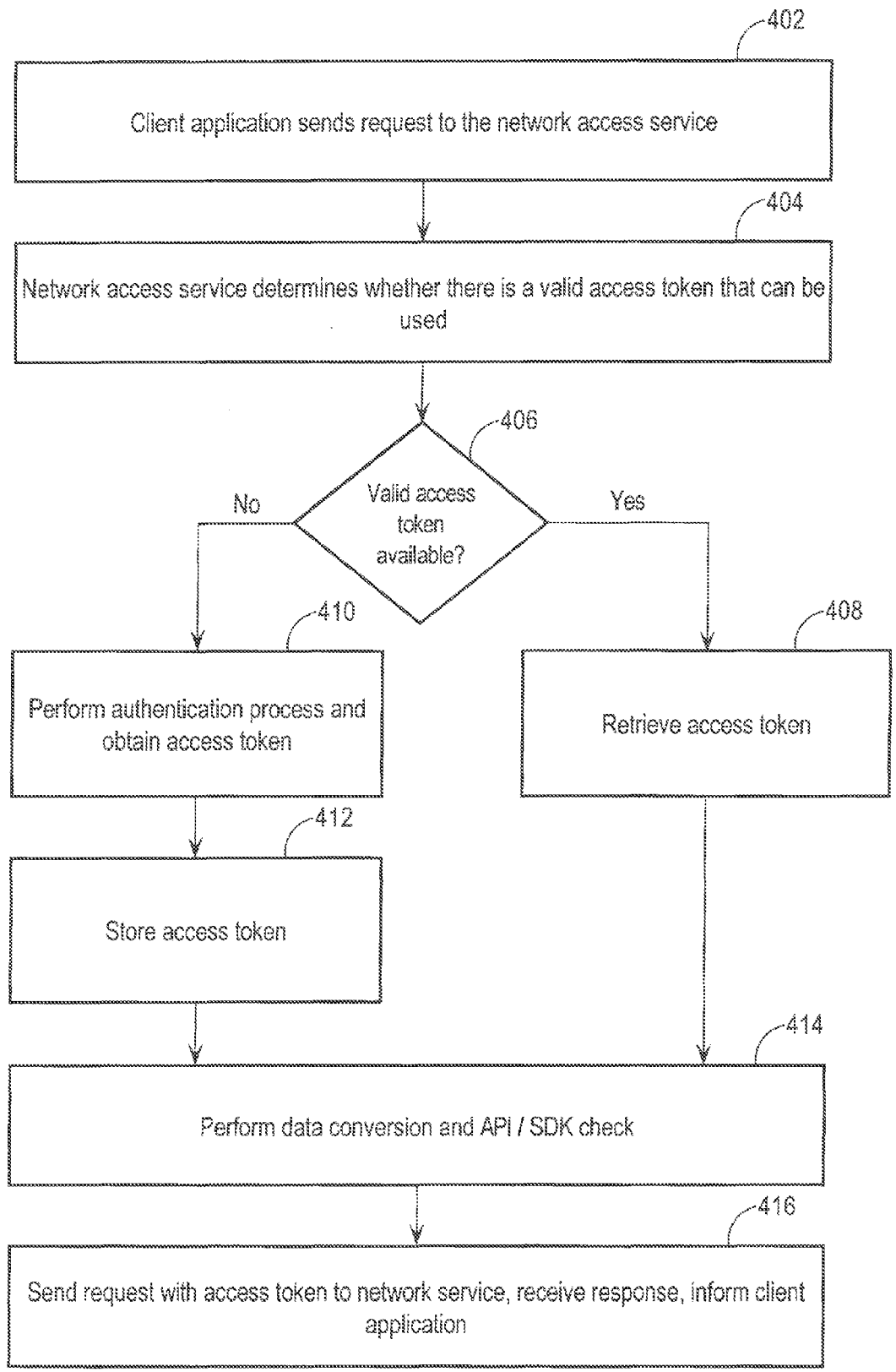
FIG. 4 depicts a flow diagram of a process for reusing access tokens to access a network service.

FIG. 4 depicts a flow diagram 400 of a process for reusing access tokens to access a network service. Although FIG. 4 is depicted and described in the context of access tokens, embodiments are not limited to access tokens and any type of access data may be used.

In step 402, a client application sends a request to the network access service. For example, client application 114 generates and transmits, to network access service 130, a request to store particular data on network service 152. In step 404, the network access service determines whether there is a valid access token that can be used. For example, network access service 130 determines whether there is a valid access token for the user of client application 114, client application 114 and network service 152. This determination may be made, for example, by examining the access tokens 304 stored and maintained by network access service 130 to determine whether a valid access token is available for a particular user/client application/network service combination.

In step 406, if a valid access token is available, then in step 408, the access token is retrieved. If, in step 406, a valid access token is not available, then in step 410, authentication is performed as previously described herein to obtain an access token. In step 412, the new access token is stored, for example, in access tokens 304.

In step 414, any required data conversions and API/SDK checks are performed. This may include, for example, network access service 130 formatting the data to be stored into a format that is supported by network service 152, performing language conversion, and adding and/or changing other information to allow the data to be stored at network service 152. For example, network access service 130 may convert the data between a data format supported by client application 114 into a format supported by network service 152, such as XML, ReST, SOAP, etc. This may include identifying API/SDK version mismatches. For example, in the situation where a client application is using a previous and unsupported version of an API/SDK and a network service implements a later version of the API/SDK, network access service 130 is able to identify the version mismatch and invoke the latest version of API/SDK supported by the network service. Also, while sending a response back to a client application, network access service may alert or provide a warning, for example in the form of a warning field, to inform the client application that the network service is using a different/newer version of API/SDK.

In step 416, a request is sent with the access token to the network service, a response is received, and the client application is informed of the result. For example, network access service 130 sends the request to network service 152 and receives, from network service 152, a response indicating whether the data was stored successfully. Network access service 130 then generates and transmits a status message to client application 114 indicating whether the data was successfully stored on network service 152. In situations where an authentication protocol limits access tokens to a single use only, then network access service 130 automatically re-performs authentication to obtain a new access token each time that an access token is used, so that a new current access token will be available for subsequent requests. Network access service 130 may also automatically acquire new access tokens in other situations, for example, if there is a disruption or error that prevents a request from being completely processed. This may be performed by network access service 130 without any involvement from client applications.

Although embodiments are described herein in the context of processing a request from a client application with respect to a single network service, embodiments are not limited to this context and requests may be processed using multiple network services. For example, a request from a client application may request that data first be processed by a first network service and that the results of that processing be stored at a second network service. In this situation, network access service 130 handles the processing of the data by the two network services on behalf of the client application using an access token for each network service. Many different processing combinations are possible, depending upon a particular implementation.

B. Logical Groups

Although embodiments are described herein in the context of individual users, embodiments are not limited to this context and are also applicable to logical groups. A logical group may be any group of which a user may be a member. Examples of logical groups include, without limitation, business organizations and sub-organizations, groups within business organizations, teams, social groups, clubs, etc. The use of logical groups may be beneficial in situations where several users wish to access network services as a group, rather than as individuals. For example, a team or group of employees within a business organization may be working on a project and wish to store electronic documents for the project to a network service. In this example, it is desirable for any member of the team to be able to store and retrieve electronic documents for the project to and from the network service using credentials for the team, instead of each user using their own individual credentials. As another example, members of a sports team, including players and coaches, may wish to store and retrieve information about the team to a network service as a team, rather than as individuals.

According to an embodiment, each logical group has a set of credentials for obtaining access data in accordance with an authorization protocol. For example, in the context of OAuth 2.0, each logical group has a set of credentials that are used by network access service 130 to obtain an authorization code for the logical group that is in turn used to obtain access tokens for the logical group. Each logical group has a corresponding set of one or more access tokens 304, where each access token is specific to a particular logical group/client application/network service combination. So, each logical group may have many access tokens, depending upon the number of corresponding client applications and network services.

According to one embodiment, network access service 130 acquires and manages access tokens for logical groups in the same manner as previously described herein with respect to individual users. When network access service 130 receives a request that specifies a particular logical group, network access service 130 determines whether access tokens 304 include a particular access token for the particular logical group/client application/network service combination specified in the request. If not, then network access service 130 performs authentication required by the network service to acquire an access token for the particular logical group/client application/network service combination specified in the request. The acquired access token is saved in access tokens 304. Logical group data 306 may specify mappings between users and logical groups, i.e., logical groups that users are members of Users may belong to any number of logical groups.

IV. Implementation Mechanisms

Although the flow diagrams of the present application depict a particular set of steps in a particular order, other implementations may use fewer or more steps, in the same or different order, than those depicted in the figures.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
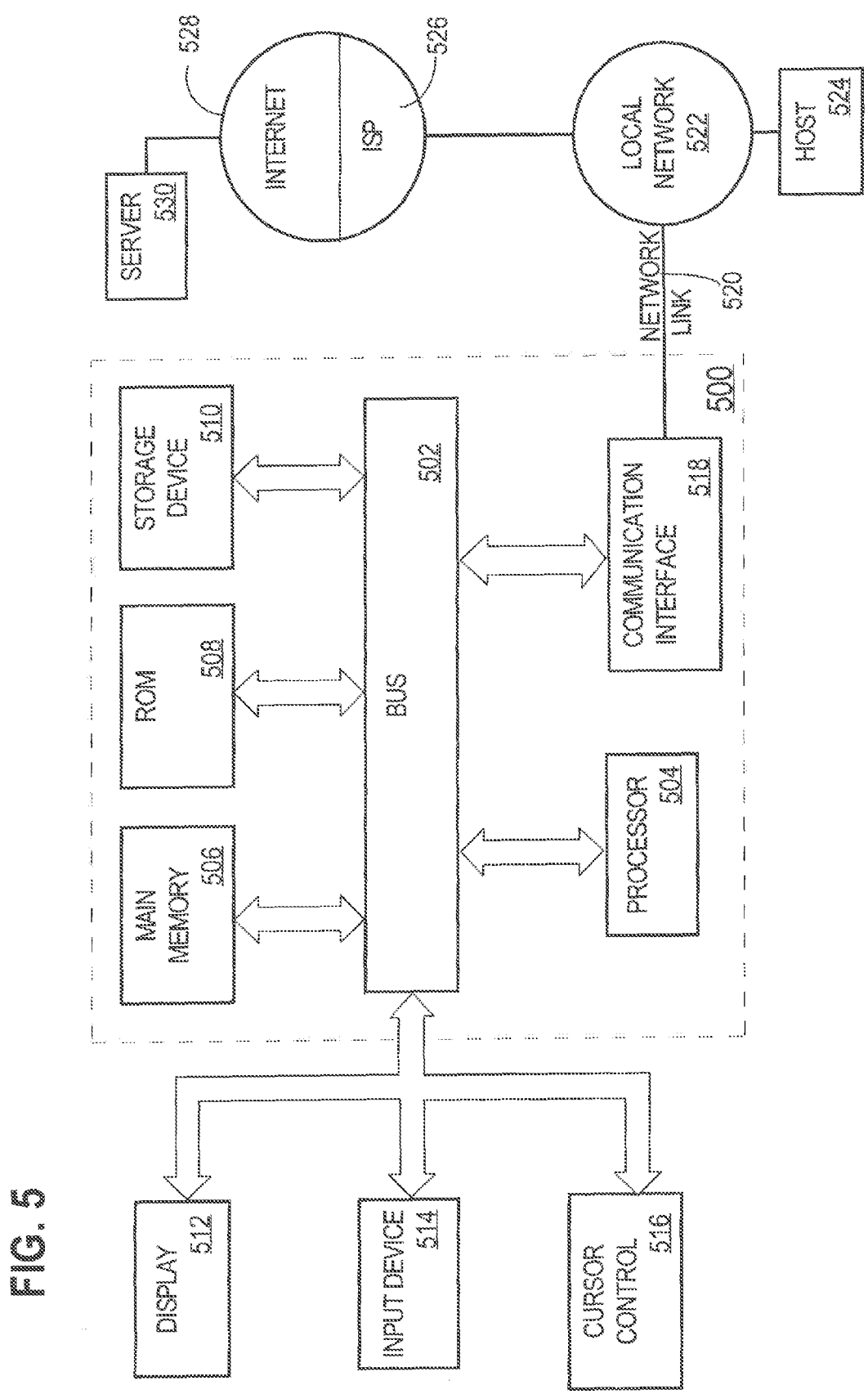
FIG. 5 is a block diagram that depicts an example computer system upon which embodiments may be implemented.

FIG. 5 is a block diagram that depicts an example computer system 500 upon which embodiments may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. Although bus 502 is illustrated as a single bus, bus 502 may comprise one or more buses. For example, bus 502 may include without limitation a control bus by which processor 504 controls other devices within computer system 500, an address bus by which processor 504 specifies memory locations of instructions for execution, or any other type of bus for transferring data or signals between components of computer system 500.

An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic or computer software which, in combination with the computer system, causes or programs computer system 500 to be a special-purpose machine. According to one embodiment, those techniques are performed by computer system 500 in response to processor 504 processing instructions stored in main memory 506. Such instructions may be read into main memory 506 from another non-transitory computer-readable medium, such as storage device 510. Processing of the instructions contained in main memory 506 by processor 504 causes performance of the functionality described herein. In alternative embodiments, hard-wired circuitry may be used in place of or in combination with software instructions to implement the embodiments. Thus, embodiments are not limited to any specific combination of hardware circuitry and software.

The term "non-transitory computer-readable medium" as used herein refers to any non-transitory medium that participates in providing data that causes a computer to operate in a specific manner. In an embodiment implemented using computer system 500, various computer-readable media are involved, for example, in providing instructions to processor 504 for execution. Such media may take many forms, including but not limited to, non-volatile and volatile non-transitory media. Non-volatile non-transitory media includes, for example, optical or magnetic disks, such as storage device 510. Volatile non-transitory media includes dynamic memory, such as main memory 506. Common forms of non-transitory computer-readable media include, without limitation, a floppy disk, a flexible disk, hard disk, magnetic tape, or any other magnetic medium, a CD-ROM, any other optical medium, a RAM, a PROM, and EPROM, a FLASH-EPROM, any other memory chip, memory cartridge or memory stick, or any other medium from which a computer can read.

Various forms of non-transitory computer-readable media may be involved in storing instructions for processing by processor 504. For example, the instructions may initially be stored on a storage medium of a remote computer and transmitted to computer system 500 via one or more communications links. Bus 502 carries the data to main memory 506, from which processor 504 retrieves and processes the instructions. The instructions received by main memory 506 may optionally be stored on storage device 510 either before or after processing by processor 504.

Computer system 500 also includes a communication interface 518 coupled to bus 502. Communication interface 518 provides a communications coupling to a network link 520 that is connected to a local network 522. For example, communication interface 518 may be a modem to provide a data communication connection to a telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be processed by processor 504 as it is received, and/or stored in storage device 510, or other non-volatile storage for later execution.

In the foregoing specification, embodiments have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus comprising:
   one or more processors; and
   one or more memories storing instructions which, when processed by the one or more processors, cause:
   a network access service receiving, from a client application executing on a first client device, a first request for the client application to access a network service that requires performance of a particular authentication process for access,
   in response to the network access service receiving, from the client application executing on the first client device, the first request for the client application executing on the first client device to access the network service, the network access service:
   performing, based upon user credentials for a user of the client application, the particular authentication process on behalf of the client application executing on the first client device to obtain a first access token for accessing the network service,
   using the first access token to access the network service on behalf of the client application executing on the first client device, and
   again performing, based upon the user credentials for the user of the client application, the particular authentication process on behalf of the client application executing on the first client device to obtain a second access token for accessing the network service, wherein the second access token is different than the first access token,
   the network access service receiving, from the client application executing on a second client device that is different than the first client device, a second request for the client application executing on the second client device to access the network service, and
   in response to the network access service receiving, from the client application executing on the second client device, the second request for the client application executing on the second client device to access the network service, the network access service using the second access token to access the network service on behalf of the client application executing on the second client device.

2. The apparatus of claim 1, wherein:
   the second access token is valid for a specified amount of time, and
   the one or more memories store additional instructions which, when processed by the one or more processors cause the network access service to:
   determine, based upon the specified amount of time for the second access token, whether the second access token is still valid,
   if, based upon the specified amount of time for the second access token, the second access token is no longer valid, then:
   performing, based upon the user credentials for the user, the particular authentication process on behalf of the client application to obtain a third access token for accessing the network service, wherein the third access token is different than the first access token and the second access token, and
   use the third access token for subsequent requests to access the network service on behalf of the client application.

3. The apparatus of claim 1, wherein the one or more memories store additional instructions which, when processed by the one or more processors cause:
   the network access service receiving, from the client application executing on the first client device, a third request for the client application to access the network service that requires performance of a particular authentication process for access, wherein the third request is associated with a third user of the client application,
   in response to the network access service receiving, from the client application executing on the first client device, the third request for the client application executing on the first client device to access the network service, the network access service retrieving and using a third access token to access the network service on behalf of the client application executing on the first client device and the second user.

4. The apparatus of claim 1, wherein the one or more memories store additional instructions which, when processed by the one or more processors cause:
   the network access service receiving, from the client application executing on the first client device, a third request for the client application to access the network service that requires performance of the particular authentication process for access, wherein the third request specifies a logical group,
   in response to the network access service receiving, from the client application executing on the first client device, the third request for the client application executing on the first client device to access the network service, wherein the third request specifies a logical group, the network access service:
   determining whether an access token is available for the logical group with respect to both the client application executing on the first client device and the network service,
   in response to determining that an access token is available for the logical group with respect to both the client application executing on the first client device and the network service, the using the access token that is available for the logical group with respect to both the client application executing on the first client device and the network service to process the third request at the client application executing on the first client device, and
   in response to determining that an access token is not available for the logical group with respect to both the client application executing on the first client device and the network service, then:
   performing, based upon user credentials for the logical group, the particular authentication process on behalf of the client application executing on the first client device to obtain a particular access token for accessing the network service, and
   using the particular access token to process the third request with respect to the network service.

5. The apparatus of claim 1, wherein:
   the first request for the client application to access the network service includes a request for data from the client application to be stored by the network service, and
   the one or more memories store additional instructions which, when processed by the one or more processors cause the network access service to format the data from the client application in a format that is supported by the network service and different than a format in which the data is received from the client application.

6. The apparatus of claim 1, wherein the network access service using the first access token to access the network service on behalf of the user of the client application includes issuing one or more instructions that conform to an application program interface that is supported by the network service and not supported by the client application.

7. The apparatus of claim 1, wherein:
the first request for the client application to access a network service that requires performance of a particular authentication process for access includes a request for the client application to access a second network service that is different than the first network service and requires performance of a second particular authentication process for access that is different than the particular authentication process, and
the one or more memories store additional instructions which, when processed by the one or more processors cause the network access service to in response to the request for the client application to access a second network service that is different than the first network service and requires performance of a second particular authentication process for access that is different than the particular authentication process, the network access service retrieving a third access token for the particular user of the client application with respect to the second network service and using the third access token to access the second network service.

8. One or more non-transitory computer-readable media storing instructions which, when processed by one or more processors, cause:
a network access service receiving, from a client application executing on a first client device, a first request for the client application to access a network service that requires performance of a particular authentication process for access,
in response to the network access service receiving, from the client application executing on the first client device, the first request for the client application executing on the first client device to access the network service, the network access service:
performing, based upon user credentials for a user of the client application, the particular authentication process on behalf of the client application executing on the first client device to obtain a first access token for accessing the network service,
using the first access token to access the network service on behalf of the client application executing on the first client device, and
again performing, based upon the user credentials for the user of the client application, the particular authentication process on behalf of the client application executing on the first client device to obtain a second access token for accessing the network service, wherein the second access token is different than the first access token,
the network access service receiving, from the client application executing on a second client device that is different than the first client device, a second request for the client application executing on the second client device to access the network service, and
in response to the network access service receiving, from the client application executing on the second client device, the second request for the client application executing on the second client device to access the network service, the network access service using the second access token to access the network service on behalf of the client application executing on the second client device.

9. The one or more non-transitory computer-readable media of claim 8, wherein:
the second access token is valid for a specified amount of time, and
the one or more non-transitory computer-readable media store additional instructions which, when processed by the one or more processors cause the network access service to:
determine, based upon the specified amount of time for the second access token, whether the second access token is still valid,
if, based upon the specified amount of time for the second access token, the second access token is no longer valid, then:
performing, based upon the user credentials for the user, the particular authentication process on behalf of the client application to obtain a third access token for accessing the network service, wherein the third access token is different than the first access token and the second access token, and
use the third access token for subsequent requests to access the network service on behalf of the client application.

10. The one or more non-transitory computer-readable media of claim 8, wherein the one or more non-transitory computer-readable media store additional instructions which, when processed by the one or more processors cause:
the network access service receiving, from the client application executing on the first client device, a third request for the client application to access the network service that requires performance of a particular authentication process for access, wherein the third request is associated with a third user of the client application,
in response to the network access service receiving, from the client application executing on the first client device, the third request for the client application executing on the first client device to access the network service, the network access service retrieving and using a third access token to access the network service on behalf of the client application executing on the first client device and the second user.

11. The one or more non-transitory computer-readable media of claim 8, wherein the one or more non-transitory computer-readable media store additional instructions which, when processed by the one or more processors cause:
the network access service receiving, from the client application executing on the first client device, a third request for the client application to access the network service that requires performance of the particular authentication process for access, wherein the third request specifies a logical group,
in response to the network access service receiving, from the client application executing on the first client device, the third request for the client application executing on the first client device to access the network service, wherein the third request specifies a logical group, the network access service:
determining whether an access token is available for the logical group with respect to both the client application executing on the first client device and the network service,
in response to determining that an access token is available for the logical group with respect to both the client application executing on the first client device and the network service, the using the access token that is available for the logical group with respect to both the client application executing on the first client device and the network service to process the third request at the client application executing on the first client device, and in response to determining that an access token is not available for the logical group with respect to both the client application executing on the first client device and the network service, then:

performing, based upon user credentials for the logical group, the particular authentication process on behalf of the client application executing on the first client device to obtain a particular access token for accessing the network service, and using the particular access token to process the third request with respect to the network service.

12. The one or more non-transitory computer-readable media of claim 8, wherein:

the first request for the client application to access the network service includes a request for data from the client application to be stored by the network service, and the one or more non-transitory computer-readable media store additional instructions which, when processed by the one or more processors cause the network access service to format the data from the client application in a format that is supported by the network service and different than a format in which the data is received from the client application.

13. The one or more non-transitory computer-readable media of claim 8, wherein the network access service using the access token to access the network service on behalf of the user of the client application includes issuing one or more instructions that conform to an application program interface that is supported by the network service and not supported by the client application.

14. The one or more non-transitory computer-readable media of claim 8, wherein:

the first request for the client application to access a network service that requires performance of a particular authentication process for access includes a request for the client application to access a second network service that is different than the first network service and requires performance of a second particular authentication process for access that is different than the particular authentication process, and the one or more non-transitory computer-readable media store additional instructions which, when processed by the one or more processors cause the network access service to in response to the request for the client application to access a second network service that is different than the first network service and requires performance of a second particular authentication process for access that is different than the particular authentication process, the network access service retrieving a third access token for the particular user of the client application with respect to the second network service and using the third access token to access the second network service.

15. A computer-implemented method comprising:

a network access service receiving, from a client application executing on a first client device, a first request for the client application to access a network service that requires performance of a particular authentication process for access, in response to the network access service receiving, from the client application executing on the first client device, the first request for the client application executing on the first client device to access the network service, the network access service:

performing, based upon user credentials for a user of the client application, the particular authentication process on behalf of the client application executing on the first client device to obtain a first access token for accessing the network service, using the first access token to access the network service on behalf of the client application executing on the first client device, and again performing, based upon the user credentials for the user of the client application, the particular authentication process on behalf of the client application executing on the first client device to obtain a second access token for accessing the network service, wherein the second access token is different than the first access token, the network access service receiving, from the client application executing on a second client device that is different than the first client device, a second request for the client application executing on the second client device to access the network service, and in response to the network access service receiving, from the client application executing on the second client device, the second request for the client application executing on the second client device to access the network service, the network access service using the second access token to access the network service on behalf of the client application executing on the second client device.

16. The computer-implemented method of claim 15, wherein:

the second access token is valid for a specified amount of time, and the computer-implemented method further comprises the network access service:

determining, based upon the specified amount of time for the second access token, whether the second access token is still valid, if, based upon the specified amount of time for the second access token, the second access token is no longer valid, then:

performing, based upon the user credentials for the user, the particular authentication process on behalf of the client application to obtain a third access token for accessing the network service, wherein the third access token is different than the first access token and the second access token, and use the third access token for subsequent requests to access the network service on behalf of the client application.

17. The computer-implemented method of claim 15, further comprising:

the network access service receiving, from the client application executing on the first client device, a third request for the client application to access the network service that requires performance of a particular authentication process for access, wherein the third request is associated with a third user of the client application, in response to the network access service receiving, from the client application executing on the first client device, the third request for the client application executing on the first client device to access the network service, the network access service retrieving and using a third access token to access the network service on behalf of the client application executing on the first client device and the second user.

18. The computer-implemented method of claim 15, further comprising:
the network access service receiving, from the client application executing on the first client device, a third request for the client application to access the network service that requires performance of the particular authentication process for access, wherein the third request specifies a logical group,
in response to the network access service receiving, from the client application executing on the first client device, the third request for the client application executing on the first client device to access the network service, wherein the third request specifies a logical group, the network access service:
  determining whether an access token is available for the logical group with respect to both the client application executing on the first client device and the network service,
  in response to determining that an access token is available for the logical group with respect to both the client application executing on the first client device and the network service, the using the access token that is available for the logical group with respect to both the client application executing on the first client device and the network service to process the third request at the client application executing on the first client device, and
  in response to determining that an access token is not available for the logical group with respect to both the client application executing on the first client device and the network service, then:
    performing, based upon user credentials for the logical group, the particular authentication process on behalf of the client application executing on the first client device to obtain a particular access token for accessing the network service, and
    using the particular access token to process the third request with respect to the network service.

19. The computer-implemented method of claim 15, wherein:
the first request for the client application to access the network service includes a request for data from the client application to be stored by the network service, and
the computer-implemented method further comprises the network access service formatting the data from the client application in a format that is supported by the network service and different than a format in which the data is received from the client application.

20. The computer-implemented method of claim 15, wherein the network access service using the access token to access the network service on behalf of the user of the client application includes issuing one or more instructions that conform to an application program interface that is supported by the network service and not supported by the client application.

* * * * *